(12) United States Patent
Miyazaki

(10) Patent No.: US 8,157,455 B2
(45) Date of Patent: Apr. 17, 2012

(54) OPTICAL CONNECTOR

(75) Inventor: Hideki Miyazaki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 700 days.

(21) Appl. No.: 12/032,157

(22) Filed: Feb. 15, 2008

(65) Prior Publication Data

US 2010/0278488 A1 Nov. 4, 2010

(51) Int. Cl.
*G02B 6/36* (2006.01)
*G02B 6/38* (2006.01)
*G02B 6/40* (2006.01)

(52) U.S. Cl. ............... 385/54; 385/60; 385/72; 385/78; 385/90; 385/92

(58) Field of Classification Search .................. 385/54, 385/60, 72, 78, 90, 92
See application file for complete search history.

(56) References Cited

U.S. PATENT DOCUMENTS

| | | | |
|---|---|---|---|
| 2002/0041738 A1* | 4/2002 | Carberry et al. | 385/56 |
| 2002/0172468 A1* | 11/2002 | Naghski et al. | 385/54 |
| 2006/0067627 A1* | 3/2006 | Crews et al. | 385/59 |
| 2007/0086707 A1* | 4/2007 | Suzuki et al. | 385/58 |

FOREIGN PATENT DOCUMENTS

| | | |
|---|---|---|
| JP | 63-231408 A | 9/1988 |
| JP | 8-211250 | 8/1996 |
| JP | 11-64685 | 3/1999 |
| JP | 2001-318274 | 11/2001 |
| JP | 2003-515785 | 5/2003 |
| JP | 2004-507785 | 3/2004 |

OTHER PUBLICATIONS

Japanese Office Action issued Apr. 15, 2011, in Patent Application No. 2006-222920 (with English-language translation).
Office Action issued Jul. 1, 2011 in Japanese Patent Application No. 2006-222920 (with English translation).
Notice for a Reason of Rejection issued Sep. 16, 2011 in Japanese Patent Application No. 2006-222920 (with English translation).

* cited by examiner

*Primary Examiner* — Ryan Lepisto
*Assistant Examiner* — Jerry Blevins
(74) *Attorney, Agent, or Firm* — Oblon, Spivak, McClelland, Maier & Neustadt, L.L.P.

(57) ABSTRACT

The optical connector, comprising: a first plug having a first ferrule for holding a first multiple optical fiber; a second plug having a second ferrule for holding a second multiple optical fiber; a first housing on which the first plug is detachably fixed; a second housing which is detachably fixed on the first housing and on which the second plug is fixed in such a manner that each edge face of optical fibers of the first multiple optical fiber and each edge face of optical fibers of the second multiple optical fiber are mutually adjusted, and the first housing has a first ferrule positioning member for positioning the first ferrule in relation to the second ferrule.

8 Claims, 9 Drawing Sheets

OPTICAL CONNECTOR

TECHNICAL FIELD

The present invention relates to optical connectors, particularly optical connectors capable of securely and easily connecting multiple optical fibers.

BACKGROUND

It is proposed to connect one optical fiber and the other optical fiber with use of a pair of ferrules and an elastic sleeve. In connecting one optical fiber and the other optical fiber, one ferrule is fit on the end of the one optical fiber, the other ferrule is fit on the end of the other optical fiber, and the one ferrule and the other ferrule are attached to each other with the elastic sleeve. (For instance, refer to JP63-231408A).

However, in connecting one multiple optical fiber and the other multiple optical fiber with use of the connecting mechanism for connecting the one optical fiber and the other optical fiber disclosed in JP63-231408A, it is required to fit a ferrule on each of the optical fibers and, further, to attach an elastic sleeve to each of the corresponding ferrules. Therefore, since the connecting task and the connecting mechanism for connecting one multiple optical fiber and the other multiple optical fiber have complexity, and the number of parts increases considerably, there is difficulty practically in making use of the connecting mechanism disclosed in JP63-231408A.

And therefore, an object of the present invention is to solve the above-mentioned problems and to provide an optical connector for securely and easily connecting multiple optical fibers despite it's simplicity of mechanism.

SUMMARY OF INVENTION

In order to solve the above-mentioned problem, an optical connector according to the present invention for connecting a first multiple optical fiber and a second multiple optical fiber, comprising,
a first plug having a first ferrule for holding the first multiple optical fiber;
a second plug having a second ferrule for holding the second multiple optical fiber;
a first housing on which the first plug is detachably fixed; and
a second housing which is detachably fixed on the first housing and on which the second plug is detachably fixed in such a manner that each edge face of optical fibers of the first multiple optical fiber and each edge face of optical fibers of the second multiple optical fiber are mutually connected;
wherein the first housing having a first ferrule positioning member for positioning the first ferrule in relation to the second ferrule.

In the optical connector according to the present invention, the second housing member preferably has a second ferrule positioning member for positioning the second ferrule in relation to the first ferrule.

In the optical connector according to the present invention, the first ferrule positioning member and the second ferrule positioning member are preferably plate-like members and the first ferrule positioning member has a first positioning hole into which the first ferrule is inserted for positioning the first ferrule;
the second ferrule positioning member has a second positioning hole into which the second ferrule is inserted for positioning the second ferrule;
wherein the first positioning hole and the second positioning hole are provided in corresponding positions.

In the optical connector according to the present invention, the first housing is preferably fixed on a printed board provided in an apparatus, and the second housing is preferably fixed on the apparatus side.

In the optical connector according to the present invention, preferably, a plurality of the first plugs and a plurality of the second plugs are detachably mutually connected with use of the first housing and the second housing.

In the optical connector according to the present invention, preferably, guide pins are provided projecting outwardly from the edge face of the second ferrule, and pin insertion holes are provided on the front edge of the first ferrule into which the guide pins are inserted.

BEST MODE FOR IMPLEMENTING THE INVENTION

The preferable embodiment of the present invention is described below with reference to the drawings.

Figure 1:
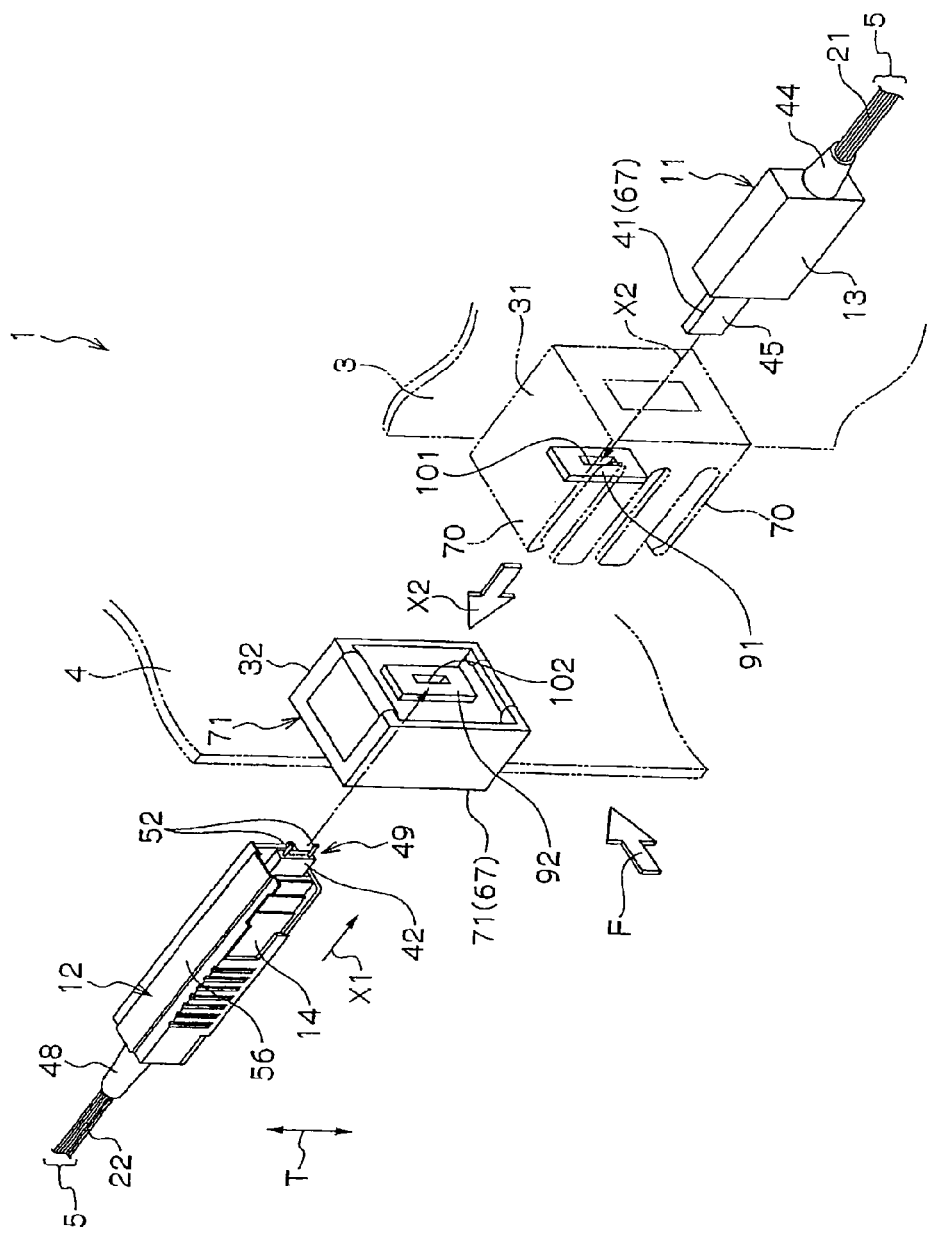
FIG. 1 is a perspective view of the preferable embodiment of the optical connector according to the present invention.

FIG. 1 is a perspective view of the preferable embodiment of the optical connector according to the present invention.

The optical connector 1 shown in FIG. 1 is an optical connector apparatus for connecting the first multiple optical fiber 21 and the second multiple optical fiber 22. The optical connector 1 has the first plug 11, the second plug 12, the first housing 31 and the second housing 32.

The first plug 11 has the first ferrule 41 for holding the first multiple optical fiber 21. The second plug 12 has the second ferrule 42 for holding the second multiple optical fiber 22.

The first housing 31 shown in FIG. 1 is a member on which the first plug 11 is detachably fixed, and the second housing 32 is a member to which the second plug 12 is detachably fixed. The second housing 32 is connected to the first housing 31 and detachably fixed on the first housing 31, on which the second plug is detachably fixed in such a manner that the front edge face of the first multiple optical fiber 21 and the front edge face of the second multiple optical fiber 22 are mutually adjusted and optically connected.

The first housing 31 in FIG. 1 is fixed on a first fixed object such as the printed board 3. The second housing 32 is fixed on a second fixed object such as the back plane 4, which is, for example, a portion of a housing of an apparatus. The printed board 3 is, for example, a circuit board.

Secondly, there are described with reference to FIG. 1 and FIG. 2 mechanism examples of the first multiple optical fiber 21, the second multiple optical fiber 22, the first plug 11 and the second plug 12. The first plug 11 and the second plug 12 are made from, for example, plastic.

Figure 2:
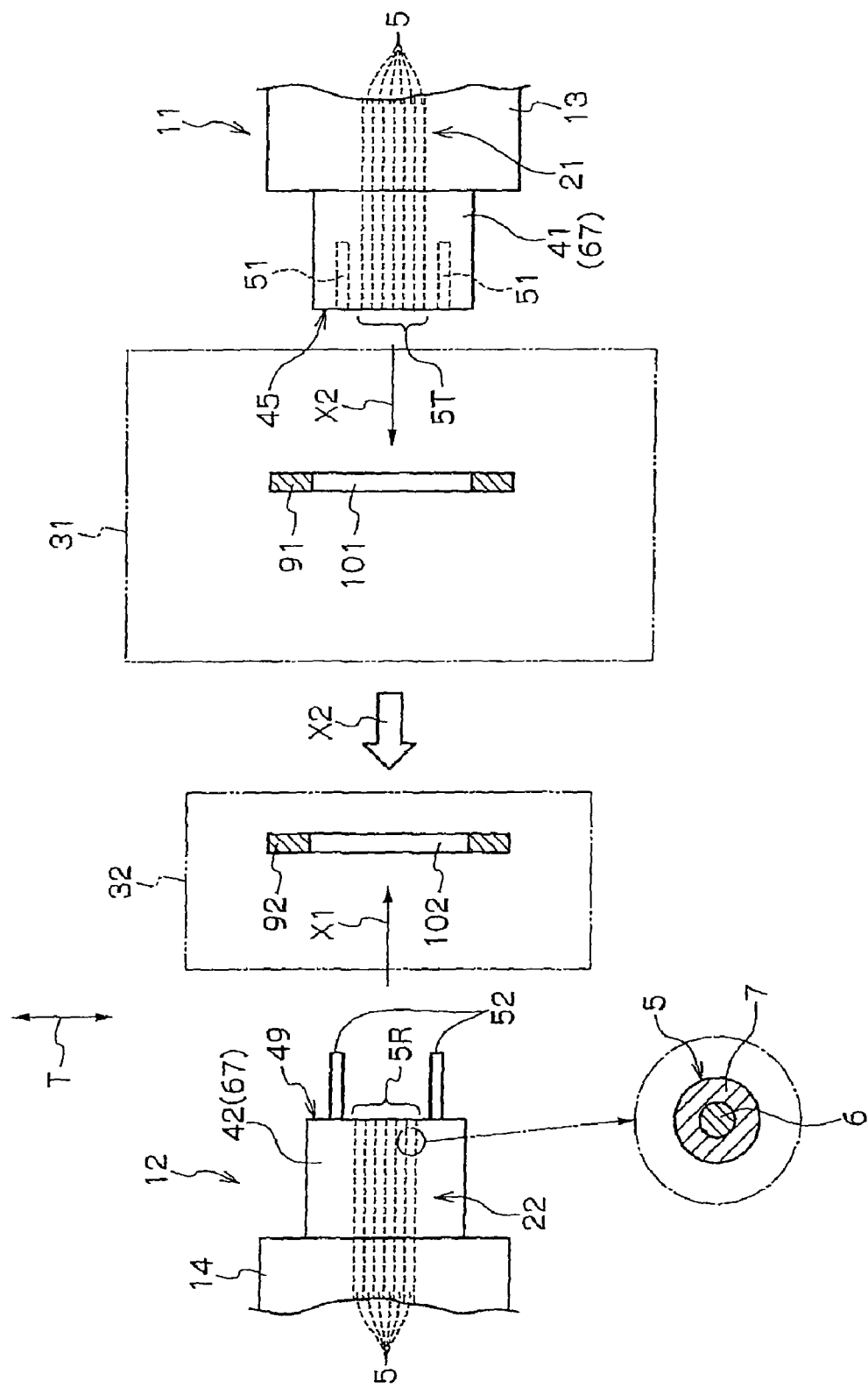
FIG. 2 is a plan view of the optical connector in FIG. 1 seen in the direction of F.

FIG. 2 is a plan view of the second plug shown in FIG. 1 seen in the direction of F.

Both of the first multiple optical fiber 21 and the second multiple optical fiber 22 are bundles of optical fibers in which a plurality of optical fibers 5 are flatly arranged and their positions are mutually fixed with tape-like member. For example, a silica-based fiber can be adopted for the optical fibers 5, and in that case, each optical fiber 5 has a diameter of 125 micrometer. Each optical fiber 5 comprises a core 6 and a clad 7 which covers the periphery of the core 6.

As shown in FIG. 1 and FIG. 2, the first plug 11 has the first plug frame 13, the first ferrule 41 and the boot 44. The first multiple optical fiber 21 is arranged to run through the inside of the first plug frame 13 and the inside of the first ferrule 41, and run out of the boot 44. The front edge faces 5T of the optical fibers 5 of the first multiple optical fiber 21 are exposed on the front edge face 45 of the first ferrule 41.

The second plug 12 has the second plug frame 14, the second ferrule 42, the boot 48 and the sliding cover 56. The second multiple optical fiber 22 is arranged to run through the inside of the second plug frame 14 and the inside of the second ferrule 42, and run out of the boot 48. The front edge faces 5R of the optical fibers 5 of the second multiple optical fiber 22 are exposed on the front edge face 49 of the second ferrule 42. As shown in FIG. 2, on the front edge face 45 of the first ferrule 41, the front edge faces 5T of the optical fibers 5 of the first multiple optical fiber 21 are serially aligned along the direction of T between a pair of pin insertion holes 51. Likewise, on the front edge face 49 of the second ferrule 42, the front edge faces 5R of the optical fibers 5 of the second multiple optical fiber 22 are serially aligned along the direction of T between a pair of guide pins 52.

As shown in FIG. 2, the first ferrule 41 has a pair of pin insertion holes 51 on the front edge face 45, and the second ferrule 42 has a pair of guide pins 52 on the front edge face 49. A pair of guide pins 52 outwardly projects from the front edge face 49, in the direction parallel to the longitudinal direction of the second multiple optical fiber, and can be inserted into a pair of pin insertion holes 51 of the first ferrule 41. Hereby, the front edge face 5T of the first ferrule 41 can be easily and securely positioned in relation to the front edge face 5R of the second ferrule 42, when the front edge face 5T of the first ferrule 41 and the front edge face 5R of the second ferrule 42 are adjusted.

Figure 3:
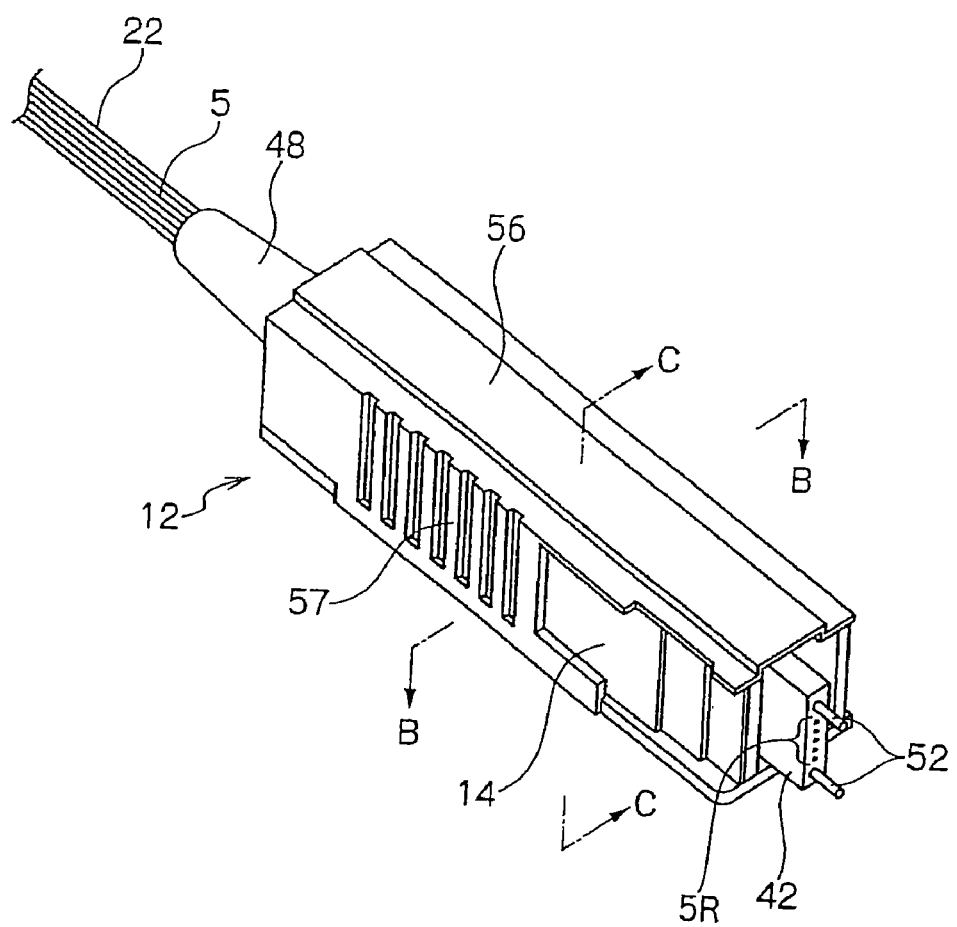
FIG. 3 is an enlarged plan view of another example of the second plug 12 shown in FIG. 2.
Figure 4:
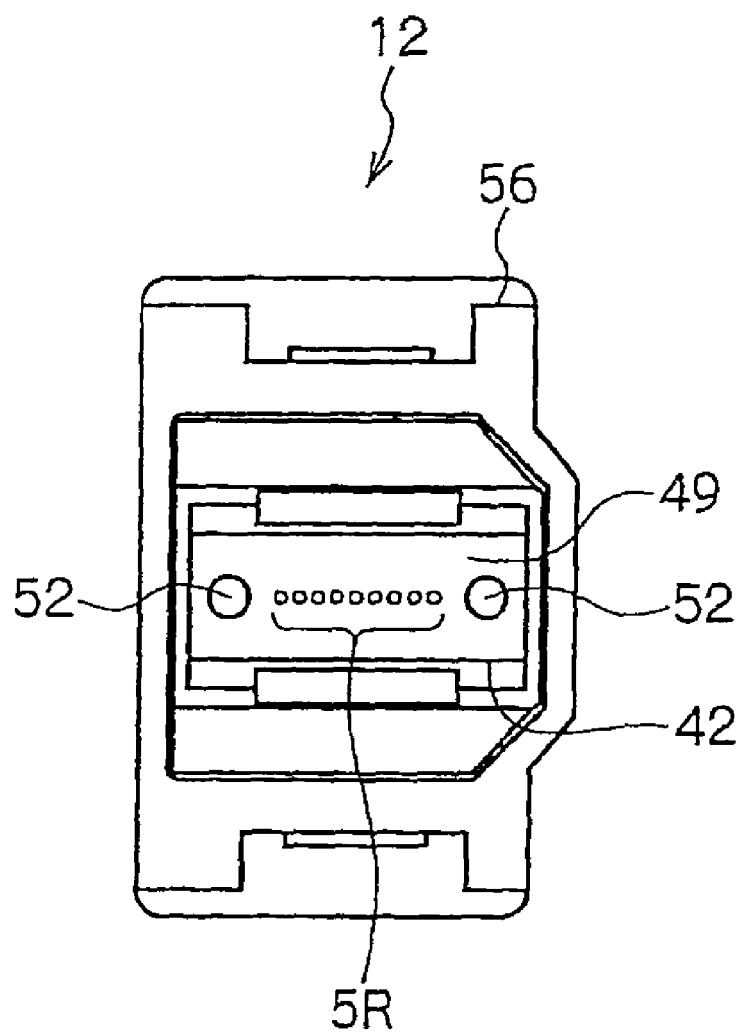
FIG. 4 is a plan view of the front edge face of the second ferrule in the second plug.

FIG. 3 is an enlarged plan view of another example of the second plug 12 shown in FIG. 2. FIG. 4 is a plan view of the second ferrule 42 in the second plug 12 seen in the direction of the front edge face 49.

As shown in FIG. 3 and FIG. 4, the sliding cover 56 is disposed on the outside of the plug frame 14, and the finger grips 57 are provided on the sliding cover. A user can pinch the finger grips 57 in connecting and detach the second plug 12 to/from the second housing 32.

Figure 5:
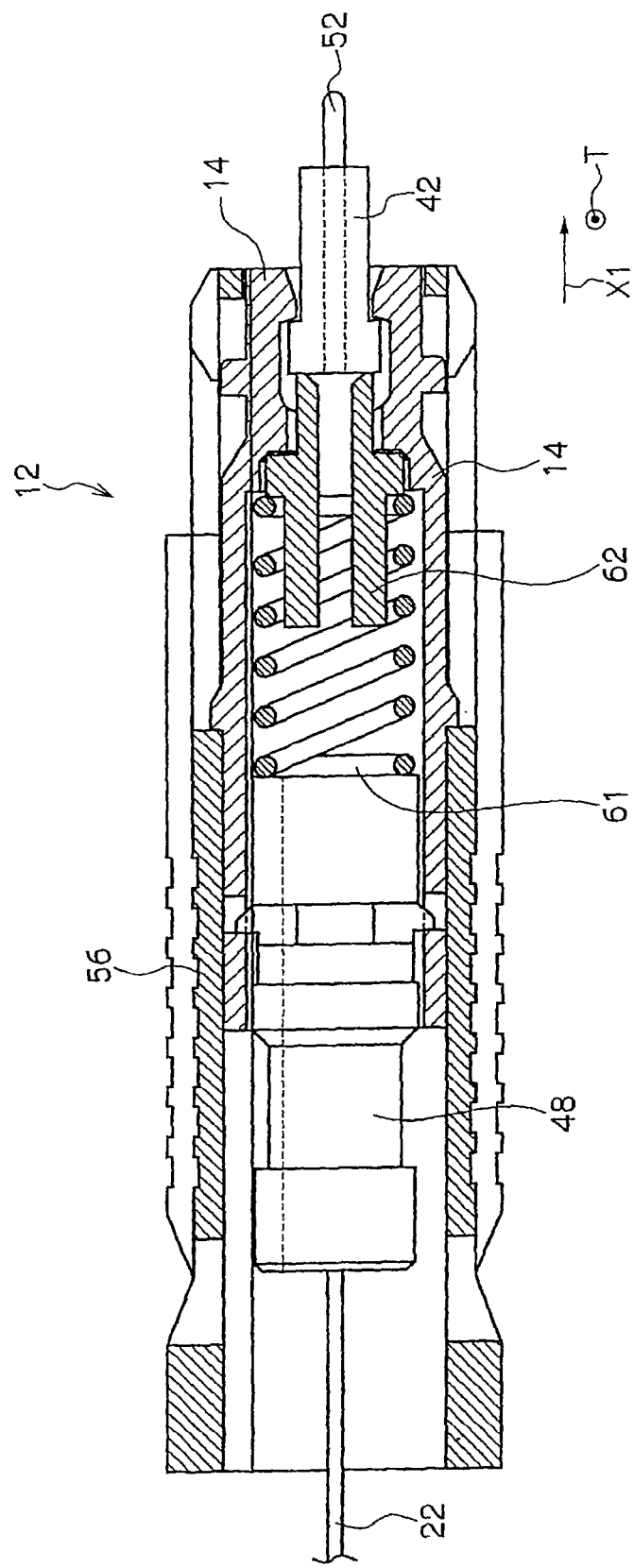
FIG. 5 is a cross sectional view of the second plug taken along the B-B line in FIG. 3.
Figure 6:
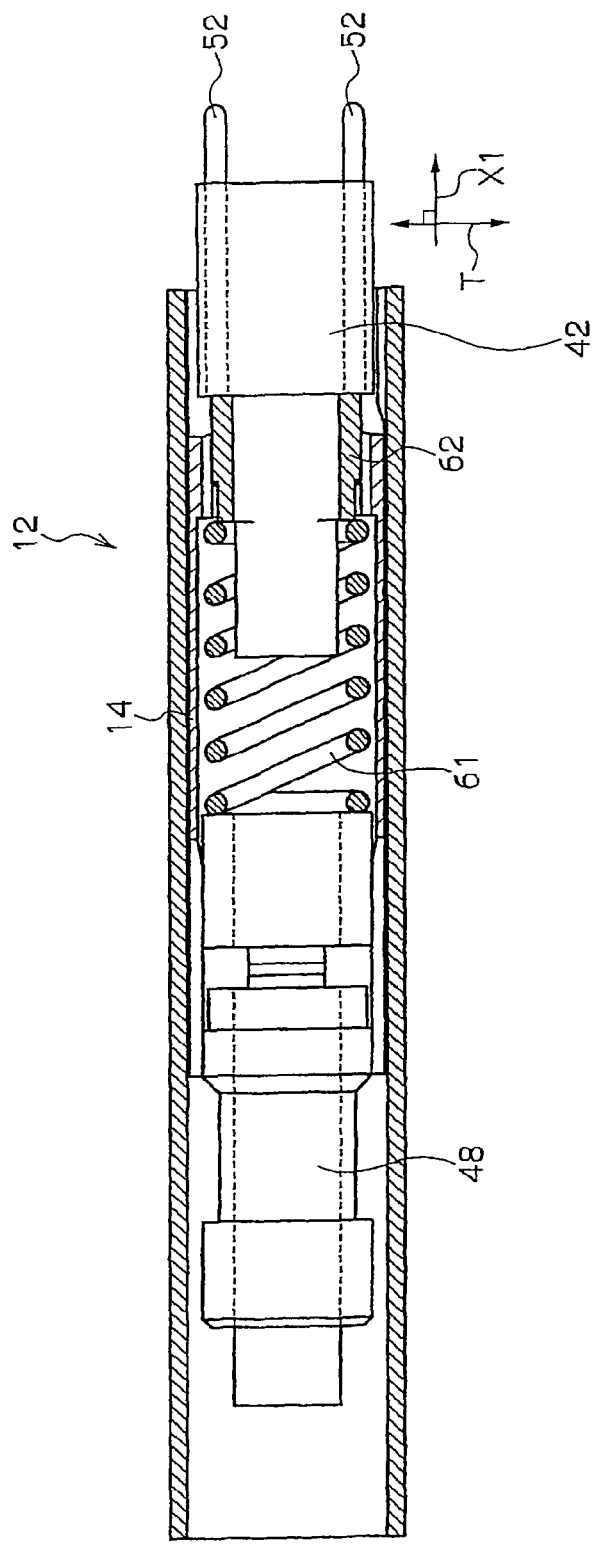
FIG. 6 is a cross sectional view of the second plug taken along the C-C line in FIG. 3.

FIG. 5 is a sectional plan view of the second plug taken along the B-B line in FIG. 3, and FIG. 6 is a sectional plan view of the second plug taken along the C-C line in FIG. 3.

As shown in FIG. 5 and FIG. 6, a spring 61 and a slider 62 are provided in the plug frame 14. The spring 61 presses the second ferrule 42 in the direction of X1 by means of pressing the slider 62. Hereby, when the front edge face 5T of the first ferrule 41 and the front edge face 5R of the second ferrule 42 are adjusted, the spring 61 absorbs pressing force. The internal mechanism of the first plug 11 is substantially similar to that of the second plug 12.

Figure 7:
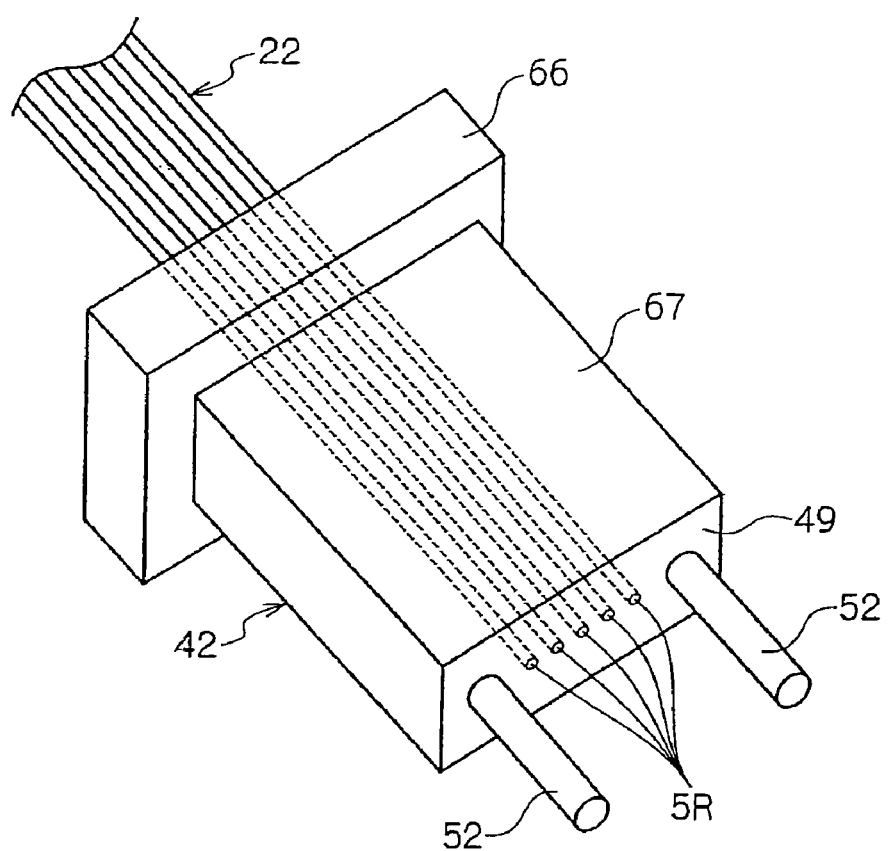
FIG. 7 is a plan view of another example of the second ferrule.

FIG. 7 shows an example of the second ferrule 42. The second ferrule 42 has a support plate 66 and a ferrule body 67. The second multiple optical fiber 22 is arranged to run through the inside of the support plate 66 and the inside of the ferrule body 67, and each front edge face 5R of optical fiber 5 are exposed on the front edge face 49 of the second ferrule 42. The first ferrule 41 has a same shape as the second ferrule 42 except for the guide pins 52 and the pin insertion holes 51.

Next, the first housing 31 and the second housing 32 are described with reference to FIG. 1 and FIG. 2.

As described above, the first housing 31 is a member on which the first plug 11 is detachably fixed, and the second housing is a member on which the second plug 12 is detachably fixed. The first housing 31 is a female housing, and the second housing 32 is a male housing. These are made of, for example, plastic. In one example, the end portion of the second housing 32 can be hooked up with the nail part 70 of the first housing 31, and hereby the first housing 31 is detachably fixed on the second housing 32.

As shown in FIG. 1 and FIG. 2, the first positioning member 91 is fixed in the first housing 31, and the second positioning member 92 is fixed in the second housing 32.

The first positioning member 91 and the second positioning member 92 are aligned in the direction of T, and are, for example, rectangular plates made of metal or plastic. These positioning members are opposingly positioned, and the rectangular first positioning hole 101 are formed in the first positioning member 91, and the rectangular second positioning hole 102 is formed in the second positioning member 92.

The first ferrule 41 is positioned by means of inserting the ferrule body 67 of the first ferrule 41 shown in FIG. 7 into the first positioning hole 101, and the second ferrule 42 is positioned by means of inserting the ferrule body 67 of the second ferrule 42 shown in FIG. 7 into the second positioning hole 102. Hereby, each front edge face of the optical fibers in the first ferrule 41 and each front edge face of the optical fibers in the second ferrule 42 can be securely and easily adjusted and optically and mechanically connected.

Next, there is described below an example of how the optical connector mentioned above is used.

As shown in FIG. 1, the first housing 31 has been fixed on the printed circuit 3, and the second housing 32 has been fixed on the back plane 4.

A user pinches the first plug frame 13 of the first plug 11 shown in FIG. 1, and inserts the first ferrule 41 into the first positioning hole 101 of the first positioning member 91 in the first housing 31 in the direction of X2 for positioning the first ferrule. And the user pinches the sliding cover 56 of the second plug 12 shown in FIG. 1, and inserts the second ferrule 42 into the second positioning hole 102 of the second positioning member 92 in the second housing 32 in the direction of X1 for positioning the second ferrule.

Figure 8:
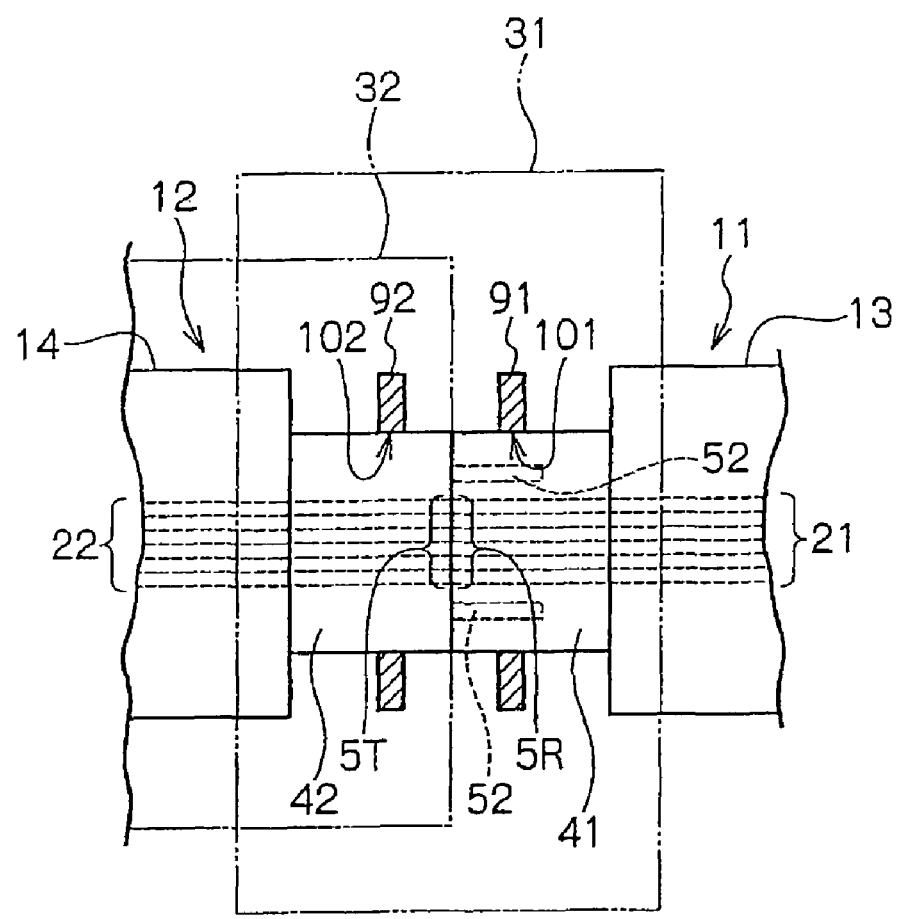
FIG. 8 is a plan view of the aspect that the first multiple optical fiber and the second multiple optical fiber are mutually attached.

And the user makes the printed circuit 3 close to the back plane 4 in the direction of X2, and detachably joins the first housing 31 to the second housing 32. Hereby, the first plug 11, the second plug 12, the first housing 31 and the second housing 32 of the optical connector 1 are joined and connected optically and mechanically as shown in FIG. 8.

As mentioned above, when all of the components of the optical connector 1 are assembled, each front edge face 5T of the optical fibers 5 of the first multiple optical fiber 21 and each front edge face 5R of the optical fiber 5 of the second multiple optical fiber 22 are mutually joined and optically connected.

In this case, the body 67 of the first ferrule 41 shown in FIG. 7 is inserted into the first positioning hole such that the first ferrule 41 is positioned, and the body 67 of the second ferrule 42 shown in FIG. 7 is inserted into the second positioning hole 102 such that the second ferrule 42 is positioned.

Hereby, each front edge face 5T of the optical fibers 5 of the first multiple optical fiber 21 and each front edge face 5R of the optical fibers 5 of the second multiple optical fiber 22 are easily and securely positioned and adjusted, and can be optically and mechanically connected. And two guide pins 52 are inserted into the corresponding pin insertion holes 51, and therefore the first ferrule 41 and the second ferrule 42 are mutually positioned securely.

Figure 9:
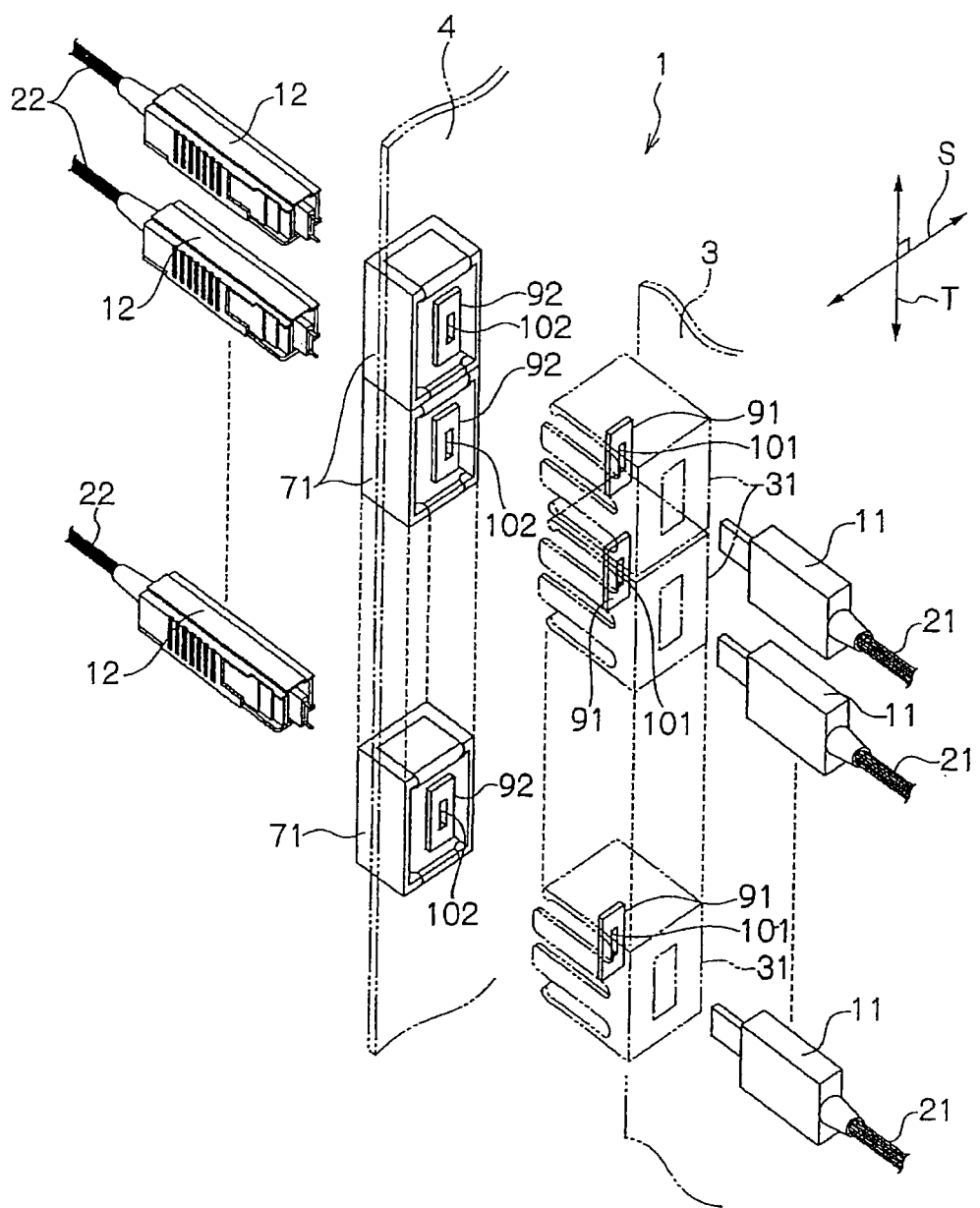
FIG. 9 shows another embodiment of the optical connector according to the present invention.

FIG. 9 is an illustration showing another embodiment.

The embodiment shown in FIG. 1 is an example that the first plug 11 and the second plug 12 are joined or connected optically and mechanically with use of the first housing 31 and the second housing 32.

In FIG. 9, there is shown the embodiment that a plurality of the first plugs 11 and a plurality of the second plugs 12 are joined or connected optically and mechanically with use of a plurality of the first housings 31 and a plurality of the second housings 32. A plurality of the first housings 31 are fixed on the printed board 3, and a plurality of the second housings 32 are fixed on the back plane 4. In the optical connector shown in FIG. 9, both of the longitudinal directions of the front edge face of the first ferrule 41 and the front edge face of the second ferrule 42 are parallel to the direction of T. And both of the buildup directions of a plurality of the first plugs 11 and a plurality of the second plugs 12 are parallel to the direction of T.

Besides the another example shown in FIG. 9, a plurality of the first housings 31 and a plurality of the second housings 32 can be made as integrated part.

The optical connector 1, as an embodiment according to the present invention, is an optical connector for connecting the first multiple optical fiber 21 and the second multiple optical fiber. This optical connector 1 comprises the first plug 11 which has the first ferrule 41 for holding the first multiple optical fiber 21, the second plug 12 having the second ferrule 42 for holding the second multiple optical fiber 22, the first housing 31 on which the first plug 11 is detachably fixed, and a second housing 32 which is detachably fixed on the first housing 31 and on which the second plug is fixed in such a manner that each edge face of optical fibers of the first multiple optical fiber 21 and each edge face of optical fibers of the second multiple optical fiber 22 are mutually adjusted. And the first housing 31 has the first positioning member 91 for positioning the first ferrule 41 in relation to the second ferrule 42. Hereby, the optical connector 1 can securely and easily connect the first multiple optical fiber 21 and the second multiple optical fiber despite it's simplicity of mechanism.

In the optical connector 1, as an embodiment according to the present invention, the first positioning member 91 and the second positioning member 92 are plate-like members. The first positioning member 91 has the first positioning hole 101 into which the first ferrule 41 is inserted for positioning the first ferrule, the second positioning member 92 has the second positioning hole 102 into which the second ferrule 42 is inserted for positioning the second ferrule, and the first positioning hole 101 and the second positioning hole 102 are provided in corresponding positions. Hereby, the first ferrule 41 and the second ferrule 42 enable the first multiple optical fiber 21 and the second multiple optical fiber 22 to be securely and easily connected despite it's simplicity of mechanism.

In the optical connector 1, as an embodiment according to the present invention, the first housing 31 is fixed on a printed board provided in an apparatus, and the second housing 32 is fixed on the housing of the apparatus. Hereby, optical transmission lines are securely and easily built up between the housing and the printed board in the apparatus with use of multiple optical fiber.

In the optical connector 1 as an embodiment according to the present invention, a plurality of the first plugs 11 and a plurality of the second plugs 12 are detachably connected with use of the first housing 31 and the second housing 32. Hereby, a plurality of multiple optical fibers are connected at one time.

In the optical connector 1 as an embodiment of the present invention, the guide pins 52 which outwardly projects from the edge face 49 of the second ferrule is provided, and the front edge face 45 of the first ferrule 41 has the pin insertion holes 51 for inserting the guide pins 52 are provided. Hereby, the first ferrule 41 can be securely and easily positioned in relation to the second ferrule 42 with use of the guide pins 52 and the pin insertion holes 51.

There can be adopted various modified examples for the present invention besides the above embodiment.

For example, the first positioning member 91 and the second positioning member 92 have plane-like shape in the embodiment described above, but they are able to have any another shape. In addition, although the first ferrule 41 and the second ferrule 42 are made respectively apart from the first housing 31 and the second housing 32 in the embodiment described above, the first ferrule 41 and the first housing 31 can be formed integrally with the second ferrule 42 and the second housing 32. Hereby, the number of parts can be reduced, and therefore the cost of the optical connector can be cut down.

The shape of the first positioning hole 101 and the shape of the second positioning hole 102 are changeable in accordance with the shape of the first ferrule 41 and the shape of the second ferrule 42.

In the optical connector 1 shown in FIG. 9, the longitudinal direction of each of the front edge faces of the first ferrules 41 and the second ferrules 42 are parallel to the direction of T, and both of the buildup directions of a plurality of the first plugs 11 and a plurality of the second plugs 12 are parallel to the direction of T. But both of the buildup directions of a plurality of the first plugs 11 and a plurality of the second plugs 12 can be parallel to the direction of S, which makes a right angle with the direction of T.

The optical connector 1 according to the present invention is capable of securely and easily connecting two multiple optical fibers mutually despite it's simplicity of mechanism.

What is claimed is:

1. An optical connector for connecting a first multiple optical fiber and a second multiple optical fiber, the connector comprising:

a first plug having a first ferrule for holding the first multiple optical fiber;

a second plug having a second ferrule for holding the second multiple optical fiber;

a first housing on which the first plug is detachably fixed;

a second housing which is detachably fixed on the first housing and on which the second plug is fixed in such a manner that each edge face of optical fibers of the first multiple optical fiber and each edge face of optical fibers of the second multiple optical fiber are mutually positioned; and a first positioning member for positioning the first ferrule in relation to the second ferrule provided in the first housing, wherein the second housing has a second positioning member for positioning the second ferrule in relation to the first ferrule, and the first ferrule positioning member and the second positioning member are plate-like members, the first positioning member has a first positioning hole for positioning the first ferrule, the second positioning member has a second positioning hole for positioning the second ferrule, and the first positioning hole and the second positioning hole are provided in positions corresponding to the first and second ferrules, respectively.

2. The optical connector according to claim 1, wherein the first housing is fixed on a circuit board provided in an apparatus, and the second housing is fixed on a housing of the apparatus.

3. The optical connector according to claim 2, wherein a plurality of the first plugs and a plurality of the second plugs are detachably connected with the first housing and the second housing.

4. The optical connector according to claim 3, wherein
guide pins are provided outwardly projecting from the front edge face of the second ferrule; and
pin insertion holes into which the guide pins are inserted are formed on the front edge face of the first ferrule.

5. The optical connector according to claim 1, wherein the first housing and the second housing are integrated with each other.

6. The optical connector according to claim 1, wherein a plurality of the first plugs and a plurality of the second plugs are detachably connected with a plurality of the first housings and a plurality of the second housings.

7. An optical connector for connecting a first multiple optical fiber and a second multiple optical fiber, the connector comprising:
a first plug having a first ferrule that holds the first multiple optical fiber;
a second plug having a second ferrule that holds the second multiple optical fiber;
a first housing on which the first plug is detachably fixed;
a second housing which is detachably fixed on the first housing and on which the second plug is fixed such that each edge face of optical fibers of the first multiple optical fiber and each edge face of optical fibers of the second multiple optical fiber are mutually positioned;
a first positioning member that positions the first ferrule in relation to the second ferrule provided in the first housing; and
a second positioning member that positions the second ferrule in relation to the first ferrule provided in the second housing, wherein
the first positioning member has a first positioning hole for positioning the first ferrule, and
the second positioning member has a second positioning hole for positioning the second ferrule.

8. The optical connector according to claim 7, wherein a size of the first and second positioning holes corresponds to a size of the first and second ferrules, respectively.

* * * * *